United States Patent
Hamerly et al.

(10) Patent No.: US 12,033,024 B2
(45) Date of Patent: *Jul. 9, 2024

(54) DETERMINING CONDITIONS OF COMPONENTS REMOVABLY COUPLED TO PERSONAL PROTECTION EQUIPMENT

(71) Applicant: 3M INNOVATIVE PROPERTIES COMPANY, St. Paul, MN (US)

(72) Inventors: Michael E. Hamerly, Vadnais Heights, MN (US); Lawrence J. Ptasienski, North Oaks, MN (US); Neal A. Rakow, Woodbury, MN (US); Cristina U. Thomas, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,920

(22) Filed: May 4, 2022

(65) Prior Publication Data
US 2022/0261564 A1 Aug. 18, 2022

Related U.S. Application Data

(63) Continuation of application No. 16/948,407, filed on Sep. 17, 2020, now Pat. No. 11,354,523, which is a continuation of application No. 16/543,726, filed on Aug. 19, 2019, now Pat. No. 10,817,683, which is a continuation of application No. 15/350,556, filed on Nov. 14, 2016, now Pat. No. 10,387,696, which is a (Continued)

(51) Int. Cl.
*A62B 9/00* (2006.01)
*G06K 7/10* (2006.01)
*G21F 3/02* (2006.01)

(52) U.S. Cl.
CPC .......... *G06K 7/10366* (2013.01); *A62B 9/006* (2013.01); *G21F 3/02* (2013.01)

(58) Field of Classification Search
CPC ........ G06K 7/10366; A62B 9/006; G21F 3/02
See application file for complete search history.

(56) References Cited

U.S. PATENT DOCUMENTS 4,656,463 A   4/1987 Anders et al.
5,023,597 A   6/1991 Salisbury
(Continued)

FOREIGN PATENT DOCUMENTS

DE   19816396   11/1999
DE   10008048   9/2001
(Continued)

OTHER PUBLICATIONS

Capital Safety ISafe Intelligent Safety System website literature, http://www.capitalsafety.com/Default.aspx?tabid=220 [retrieved from the internet Aug. 21, 2007].

(Continued)

*Primary Examiner* — Nay Tun
(74) *Attorney, Agent, or Firm* — Steven A. Bern; Sriram Srinivasan

(57) ABSTRACT

Method and system are disclosed for determining conditions of components that are removably coupled to articles of personal protection equipment (PPE) by tracking the components against predetermined criteria.

20 Claims, 5 Drawing Sheets

Related U.S. Application Data continuation of application No. 12/671,924, filed as application No. PCT/US2008/067473 on Jun. 19, 2008, now Pat. No. 9,492,690.

(60) Provisional application No. 60/999,746, filed on Aug. 31, 2007.

(56) References Cited

U.S. PATENT DOCUMENTS

| | | |
|---|---|---|
| 5,164,707 A | 11/1992 | Rasmussen et al. |
| 5,552,772 A | 5/1996 | James et al. |
| 5,666,010 A | 9/1997 | Stratiotis |
| 5,796,341 A | 8/1998 | Stratiotis |
| 5,971,282 A | 10/1999 | Rollender et al. |
| 6,031,454 A | 2/2000 | Lovejoy et al. |
| 6,100,806 A | 8/2000 | Gaukel |
| 6,144,301 A | 11/2000 | Frieden |
| 6,186,140 B1 | 2/2001 | Hoague |
| 6,472,988 B1 | 10/2002 | Feld et al. |
| 6,741,174 B2 | 5/2004 | Rhoades et al. |
| 6,853,303 B2 | 2/2005 | Chen et al. |
| 6,887,293 B1 | 5/2005 | Abad et al. |
| 6,995,665 B2 | 2/2006 | Appelt et al. |
| 6,995,673 B1 | 2/2006 | Osredkar et al. |
| 7,019,652 B2 | 3/2006 | Richardson |
| 7,044,373 B1 | 5/2006 | Garber et al. |
| 7,069,100 B2 | 6/2006 | Monette et al. |
| 7,098,793 B2 | 8/2006 | Chung |
| 7,113,094 B2 | 9/2006 | Garber et al. |
| 7,123,151 B2 | 10/2006 | Garber et al. |
| 7,158,030 B2 | 1/2007 | Chung |
| 7,464,001 B1 | 12/2008 | Adams |
| 7,592,911 B1 | 9/2009 | Hudgens et al. |
| 8,294,580 B2 | 10/2012 | Witwer |
| 2001/0047283 A1 | 11/2001 | Melick et al. |
| 2002/0008623 A1 | 1/2002 | Garber et al. |
| 2002/0031997 A1 | 3/2002 | Lawler, Jr. et al. |
| 2004/0088780 A1 | 5/2004 | Bachar |
| 2004/0100384 A1 | 5/2004 | Chen et al. |
| 2004/0131498 A1 | 7/2004 | Kuutti |
| 2005/0114154 A1 | 5/2005 | Wolkowicz et al. |
| 2005/0131578 A1 | 6/2005 | Weaver |
| 2005/0148828 A1 | 7/2005 | Lindsay |
| 2005/0149387 A1 | 7/2005 | O'Shea et al. |
| 2005/0251424 A1 | 11/2005 | Sanders et al. |
| 2005/0258238 A1 | 11/2005 | Chapman |
| 2006/0006999 A1 | 1/2006 | Walczyk et al. |
| 2006/0055552 A1 | 3/2006 | Chung et al. |
| 2006/0060512 A1 | 3/2006 | Astle |
| 2006/0064320 A1 | 3/2006 | Postrel |
| 2006/0117610 A1 | 6/2006 | Silvestri |
| 2006/0125623 A1 | 6/2006 | Appelt et al. |
| 2006/0268482 A1 | 11/2006 | Lin et al. |
| 2006/0270471 A1* | 11/2006 | Matthiessen ......... H04L 12/403 455/575.6 |
| 2007/0001837 A1 | 1/2007 | Larson et al. |
| 2007/0010721 A1 | 1/2007 | Chen et al. |
| 2007/0013519 A1 | 1/2007 | Chung et al. |
| 2007/0078528 A1 | 4/2007 | Anke |
| 2007/0199567 A1 | 8/2007 | Kanzer |
| 2008/0021919 A1* | 1/2008 | Kaartinen ............ G06Q 10/087 707/999.102 |
| 2008/0241805 A1 | 10/2008 | Schantz |
| 2009/0040014 A1 | 2/2009 | Knopf |
| 2010/0112680 A1 | 5/2010 | Brockwell |

FOREIGN PATENT DOCUMENTS

| | | |
|---|---|---|
| EP | 1516640 | 3/2005 |
| EP | 1091316 | 3/2006 |
| FR | 2801998 | 6/2001 |
| GB | 2422937 | 8/2006 |
| JP | 06-299799 | 10/1994 |
| JP | 2005-078222 | 3/2005 |
| JP | 2006-072719 | 3/2006 |
| KR | 10-2006-0101405 | 9/2006 |
| KR | 10-2006-0123918 | 12/2006 |
| WO | WO 1996/012524 | 5/1996 |
| WO | WO 1996/12524 | 5/1996 |
| WO | WO 2001/006401 | 1/2001 |
| WO | WO 2001/43827 | 6/2001 |
| WO | WO 2001/043827 | 6/2001 |
| WO | WO 2001/044082 | 6/2001 |
| WO | WO 2002/02191 | 1/2002 |
| WO | WO 2002/002191 | 1/2002 |
| WO | WO 2002/09957 | 2/2002 |
| WO | WO 2002/009957 | 2/2002 |
| WO | WO 2002/013150 | 2/2002 |
| WO | WO 2004/008900 | 1/2004 |
| WO | WO 2004/032019 | 4/2004 |
| WO | WO 2004/074964 | 9/2004 |
| WO | WO 2005/024579 | 3/2005 |
| WO | WO 2005/045461 | 5/2005 |
| WO | WO 2005/045743 | 5/2005 |
| WO | WO 2005/048041 | 5/2005 |
| WO | WO 2005/071978 | 8/2005 |
| WO | WO 2005/109303 | 11/2005 |
| WO | WO 2005/110216 | 11/2005 |
| WO | WO 2005/119590 | 12/2005 |
| WO | WO 2006/026365 | 3/2006 |
| WO | WO 2008/091164 | 7/2008 |
| WO | WO 2008/006152 | 5/2010 |

OTHER PUBLICATIONS

Durfee, Adam, et al., *White Paper on RFID, MEMS, and Their Application in the Field of Construction*, University of Kentucky, Jan. 11, 2002.

FrenchCreek Production product literature for *The Tracker* Harness Accessories, http://www.fenchcreekproduction.com/tracker.htm, 2 pages, 2005.

Initiative Business Systems Respirator Management website literature, http://www.initbusy.com/rpecasestudy.html [retrieved from the internet May 17, 2007].

Swedberg, Claire, *Safety Harnesses Get Smart*, RFID Journal, Jun. 15, 2006.

Ward, Matt et al., *RFID: Frequency, Standards, Adoption and Innovation*, JISC Technology and Standards Watch, May 2006, pp. 16-20.

WhereNet product literature for *Process Control and Machine Messaging* (2003).

"Harness Accessories" datasheet [online]. FrenchCreek Production, Franklin, PA, Feb. 2007. Retrieved from the Internet: URL:www.frenchcreekproduction.com; 2 pages.

* cited by examiner

DETERMINING CONDITIONS OF COMPONENTS REMOVABLY COUPLED TO PERSONAL PROTECTION EQUIPMENT

CROSS REFERENCE TO RELATED APPLICATIONS

This application is a continuation of U.S. Ser. No. 16/948,407, filed Sep. 17, 2020, now allowed, which is a continuation of U.S. Ser. No. 16/543,726, filed Aug. 19, 2019, issued on Oct. 27, 2020 under U.S. Pat. No. 10,817,683, which is a continuation of U.S. Ser. No. 15/350,556, filed Nov. 14, 2016, issued on Aug. 20, 2019 under U.S. Pat. No. 10,387,696, which is a continuation of U.S. Ser. No. 12/671,924, filed Feb. 3, 2010, issued on Nov. 15, 2016 under U.S. Pat. No. 9,492,690, which claims benefit of national stage filing under 35 U.S.C. 371 of PCT/US2008/067473, filed Jun. 19, 2008, which claims benefit of provisional application No. 60/999,746, filed Aug. 31, 2007, the disclosure of which is incorporated by reference in their entirety herein.

BACKGROUND

Generally, this disclosure relates to methods and systems for determining the conditions of components, particularly the disclosure relates to methods and systems for determining conditions of components removably coupled to articles of personal protection equipment (PPE), by tracking their usage in a monitored working environment against a pre-determined criterion, such as a change-out protocol.

Maintaining the safety and health of workers is a major concern across many industries. Various rules and regulations have been developed to aid in addressing this concern, which provide sets of requirements to ensure proper administration of personnel health and safety procedures. To help in maintaining worker safety and health, some individuals may be required to don, wear, carry, or otherwise use a PPE article, if the individuals enter or remain in work environments that have hazardous or potentially hazardous conditions. Known types of PPE articles include, without limitation, respiratory protection equipment (RPE), e.g., for normal condition use or emergency response, protective eyewear, such as visors, goggles, filters or shields, protective headwear, such as hard hats, hoods or helmets, hearing protection, protective shoes, protective gloves, other protective clothing, such as coveralls and aprons, protective articles, such as sensors, safety tools, detectors, global positioning devices, mining cap lamps and any other suitable gear.

For example, personnel in the nuclear industry may be required to wear radiation protective clothing and personal dosimeter devices. Law enforcement personnel are sometimes required to wear protective vests and helmets. There are numerous situations in the medical field in which healthcare workers must wear protective gowns, masks, face shields, gloves, etc. Workers in the food service industry are often required to wear hair netting, gloves, masks, etc. For example, there are also many industrial manufacturing scenarios in which personnel are required to wear protective or other specially designed articles in order to ensure a "clean" environment. For example, personnel in the micro-electronics manufacturing industry, biotech industry, laboratory/testing industry, are required to wear PPE articles not only to ensure their own safety, but to protect the equipment and devices which they assemble or perform various procedures with. There are also many industrial manufacturing scenarios in which personnel working in mines, oil refineries, metal grinding facilities, smelting facilities, industrial painting operations or pharmaceutical factories may be required to wear respiratory protection equipment (RPE).

There are many different kinds of respirators (e.g., RPE) utilized to prevent or reduce inhalation of hazardous or toxic materials. These RPE articles include, without limitation, components, for example, air-purifying filters, cartridge components, or canisters that remove specific air contaminants by passing ambient air through their air-purifying element. Typical chemical respirators use replaceable filter cartridge components that are coupled. Their proper use is contingent upon the respirators including the cartridges/canisters being replaced before they fail or that the correct types of respirators are to be used. However, many traditional respirators that include replaceable cartridges/canisters, typically, do not include any mechanism of indicating when their ability to remove contaminants from the air has been reduced. Therefore, to ensure their replacement before they fail or are otherwise in need of further processing, several U.S. guidelines require use of end of service life indicators. Presently, the availability of end of service life indicators is rather limited. Alternatively, a commonly utilized change-out schedule for respirators is based upon the identity and concentration levels of compounds expected to be encountered within the workplace over a period of time. Typically, a change-out schedule is based on an initial determination of average exposure and the corresponding duration of the component to that exposure. This initial determination establishes a required time period of service life. The user or an authorized person documents the first day of usage and keeps track of the required time period for purpose of determining when the component is not usable and needs to be disposed or otherwise processed. Clearly, the making and keeping of extensive records that contain all of the above-referenced information present a substantial administrative task.

Moreover, facilities in which workers wear PPE articles are often required to keep detailed records regarding the PPE articles as well as the individuals wearing the PPE articles. Some such records include information regarding use of PPE articles, maintenance, and condition of PPE articles, as well as training of the workers to use the PPE articles. In addition, records of certain mandatory regulations and compulsory audit histories must be kept. For example, in some cases, RPE articles require maintenance to be carried out by properly trained personnel at least every three months and after each use.

Despite the extensive records that are required to be collected regarding PPE articles and their associated components, adherence to various predetermined criteria, including a change-out criterion, is typically the responsibility of the user. Thus, compliance with a particular criterion may become an issue in work environments involving relatively large numbers of workers and/or respirators because of the relative difficulty in tracking worker habits and diligence. Clearly, workers are at a higher risk of exposure upon breakthrough of the contaminants when schedules are not adhered to.

Thus, there is a need for electronic methods and systems that could make the implementation of determining condition of components easier and more efficient, particularly in regard to tracking of components that are removably coupled to PPE articles.

SUMMARY

In one exemplary embodiment, the present disclosure is directed to a method of determining a condition of a component coupled to an article of personal protection equipment wherein the method comprises: providing at least one component removably coupled to an article of personal protection equipment; providing at least one smart tag coupled to the component or the personal protection equipment article; tracking usage of the component, wherein the tracking comprises retrieving data from the smart tag; and, determining a condition of the component based on comparing tracked usage data of the component against at least one predetermined criterion.

In another exemplary embodiment, the present disclosure is directed to a system of determining a condition of a component coupled to an article of personal protection equipment. The system comprises: at least one article of personal protection equipment; at least one component removably coupled to the article of personal protection equipment; at least one smart tag coupled to the component or the personal protection equipment article; a system for retrieving data from the smart tag; a data processing system coupled to the data retrieving system; wherein the data processing system includes a mechanism for determining a condition of the component based on comparing tracked usage data of the component against at least one predetermined criterion.

DETAILED DESCRIPTION

The present disclosure substantially reduces the drawbacks and shortcomings of the known approaches for determining the conditions of components that are removably coupled to PPE articles. The foregoing is achieved through a method and system that determines conditions of such components by using at least a smart tag coupled with the component or the PPE article removably coupled to the component so as track usage of the component. Tracking is accomplished by retrieving data from the smart tag and determining a condition of the component based on comparing the tracked usage data of the component to at least one predetermined criterion.

Figure 1:
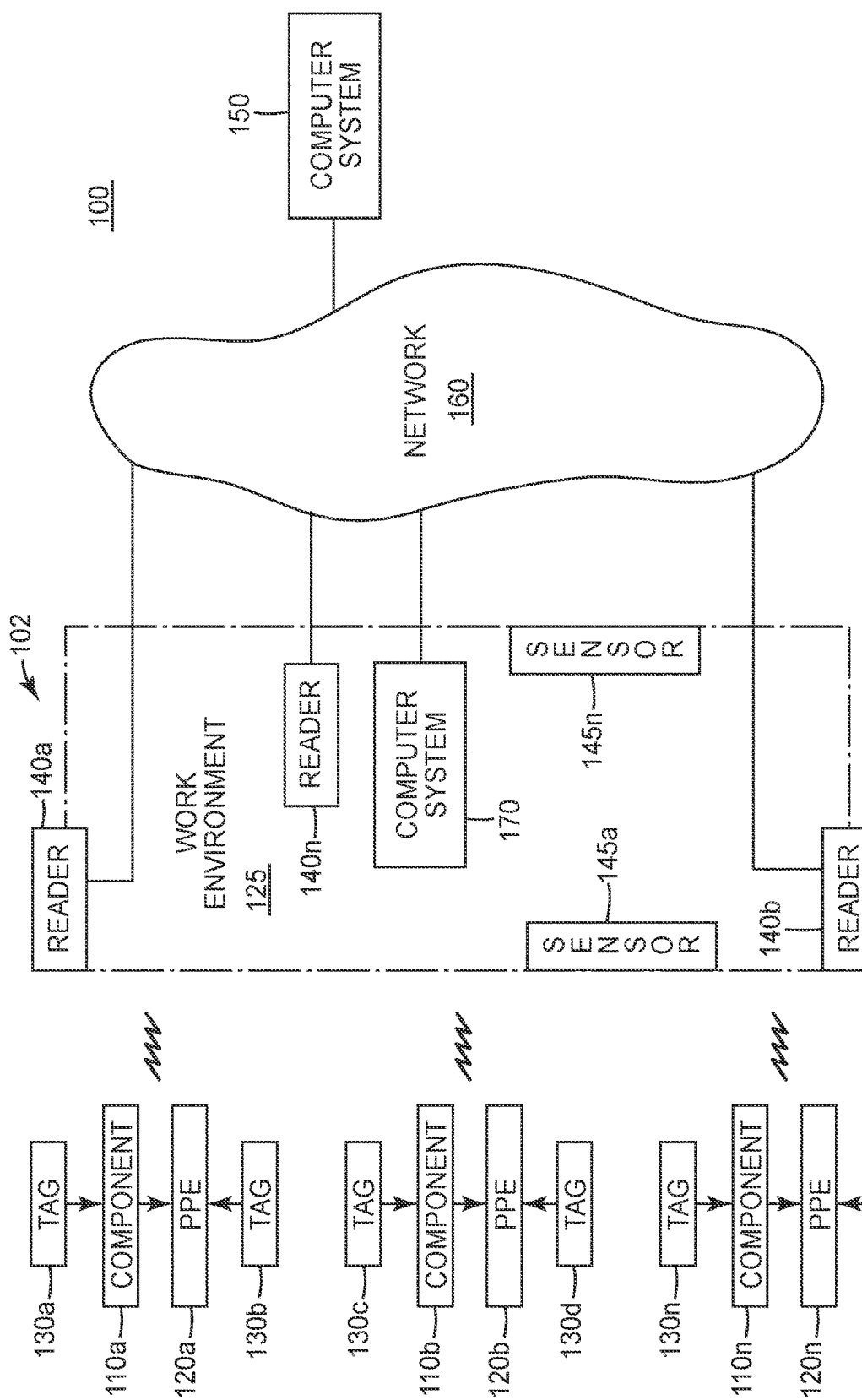
FIG. 1 is a block diagram of one exemplary component condition determining system of the present disclosure.

FIG. 1 illustrates a block diagram of a component condition determining system 100, according to one exemplary embodiment of the present disclosure. The component condition determining system 100 includes an information retrieval system 102 networked to a computer system 150. The component condition determining system 100 is utilized for implementing a process for determining a condition of one or more accessories or components 110a-n (collectively, 110). The components 110 are of the type that are removably coupled to one or more articles, such as articles of personal protection equipment (PPE) 120a-n (collectively, 120). The removably coupled components 110 and the PPE articles are to be used in one or more working environments 125 (only one is illustrated). Exemplary working environments include, without limitation, paint shops, petrochemical refineries, mines, smelting facilities, pharmaceutical factories, or the like. The term "coupled" as used in the present application means that a component is physically or operatively coupled to a PPE article so that they can function together.

In an illustrated exemplary embodiment, the PPE article 120 is an article of respiratory protective equipment (RPE) 120, and the removable coupled accessory or component 110 is a respirator filter cartridge 110. For example, the RPE article 120 may be a 7502 half face piece respirator that is commercially available from 3M Company of St. Paul, MN The respirator filter cartridge component 110 may be a 6001 Series organic vapor cartridge that is commercially available from 3M Company of St. Paul, MN The present disclosure is not limited by the foregoing combination of removably coupled components and PPE articles, but envisions all suitable combinations.

Other known types of components 110 that may be tracked according to the present disclosure include, without limitation, a nose piece, a valve cover, a strap assembly, a face piece, a hood, a helmet, a motor, a hose, a filter of a welding helmet, a visor, power supply, a lighting mechanism, such as a mini-cap lamp, etc.

The components may be removably coupled to the PPE article through any appropriate mechanical mechanism including, without limitation, snap-fit connections, such as one that prevents improper connection; hook and loop mechanisms; repositionable adhesives; clips; slots; threaded screw-in connections; bayonets; as well as other known and suitable approaches.

Other known types of PPE articles 120 that may be coupled to the components 110 include, without limitation, respiratory protection equipment (RPE), e.g., for normal use or emergency response, protective eyewear, such as visors, goggles, filters or shields, protective headwear, such as hard hats, hoods or helmets, hearing protection, protective shoes, protective gloves, other protective clothing, such as coveralls and aprons, protective articles, such as sensors, safety tools, detectors, air or liquid sampling devices, global positioning devices, mining cap lamps and any other suitable gear. Accordingly, any wide number of suitable combinations may be tracked according to the present disclosure.

The component condition determining system 100 essentially tracks usage of smart tags attached to either the removably coupled component used with PPE articles or the PPE article that is known to be coupled to the component of interest, or both. In one exemplary embodiment, the information retrieval system 102 includes one or more smart tags 130a-n (collectively, 130); one or more data acquiring devices 140a-n (collectively, 140) that acquire data from the smart tags; and, one or more sensors 145a-n (collectively, 145) that, as will be described, sense for variables that are related to usage of the component being tracked. Given the number of different kinds of smart tags, data acquiring devices, and sensors that can be used, there exists a large number of combinations for the system 102 that can be constructed depending on the type of components and PPE articles to be tracked. Accordingly, the exemplary information retrieval system 102 is but one of many different and suitable types.

The present disclosure contemplates use of any suitable smart tag known in the art. In one exemplary embodiment, the smart tag 130 may be attached to a component. In another exemplary embodiment, the smart tag 130 may be attached to an article of PPE for use in determining the condition of the removably coupled component.

Essentially, a smart tag is a data carrier that carries data accessible by suitable methods, including, but not limited to, electronic, optical, or other wireless technology. Data on a smart tag may, typically, at least, include tag identification information, such as an identification number (e.g., serial number). In addition, the smart tag 130 may contain other information relating to the article of PPE 120 or its component(s) 110, such as the type of article and/or component(s) used; historical information relating to the article and/or the component(s), information about the user (who used it, where it was used, under what condition it was used, etc.), maintenance or other type of processing, information about who wrote information onto the smart tag; any requirements relating to the article, component(s) and/or their use, whether any such requirements have been satisfied, such as any certifications obtained, and any other useful information, such as component change-out history, or the working environment. Also, information regarding the user of the article of PPE may be on the smart tag 130; such as, medical information, information relating to fit-testing, training, job responsibilities, seniority or experience, access privileges or any other information.

Smart tags include passive and active types. Generally, passive tags do not include an internal power source and the data carried thereby may be encoded at manufacture. Data information may be acquired from a passive smart tag, for example, by radio frequency, microwave, infrared, or other wireless modes; or by optical readers or other appropriate electronic or optical technology. One type of passive smart tag is radio frequency identification (RFID) tag, wherein a transponder carries read-only data. Another type of passive smart tags may be rewritable. RFID technology is known and understood by those skilled in the art and, hence, only a brief description is included herein for facilitating understanding of the present disclosure. Passive RFID type smart tags are typically provided in the form of small labels or the like that include a coiled, etched or stamped antenna, a capacitor, and a substrate on which the components are mounted or embedded. For some metallic smart tags, the metallic portion itself may serve as the antenna. The RFID type smart tag may be embedded in or attached to the components 110 and/or PPE articles 120 by any suitable approach. For example, the smart tags may be joinable as by being adhered, fastened, sewn, friction fitted, mechanically clipped, welded (e.g., ultrasonically) or molded, etc. onto or into the components, included as an integral component of the article or securely attached by any suitable means.

Besides passive RFID smart tags, other passive smart tags may include, without limitation, optical kinds including barcode and optical character recognition systems; electromagnetic systems; and acoustomagnetic systems.

On the other hand, active smart tags tend to carry their own internal power source as well as data, and an appropriate antenna for allowing exchanging of their data. The internal power supply may include a micro-battery, a thin film battery, or the like. Active smart tags may be reprogrammable and may include, besides an antenna, a microchip to receive and store additional information beyond the information contained in its fixed code. Active smart tags may exchange their data information with data acquiring and/or transmitting devices, such as including, without limitation, readers and/or writers, scanners, and/or data receivers, such as wireless receivers. The exchange may be initiated by the active smart tag itself once it finds a suitable or designated, reader, scanner, or receiver. The active smart tags may transmit their data in response to triggering or interrogating signals, they may actively transmit their data independent of such signals. For instance, the active smart tags may continuously or periodically transmit data to appropriate readers and/or writers, scanners, or receivers. As noted, some active smart tags include the capability to receive and store additional information beyond that contained by its encoded data. Other kinds of active smart tags may be configured to be rewritable. For instance, an active RFID smart tag may be rewritable, as by an RFID reader/writer.

Other kinds of active smart tags include a real time location system (RTLS) smart tag. An RTLS active smart tag is an active tag having a transmitter and a receiver and it communicates with a network according to a particular protocol. RTLS systems can work to determine the position of the smart tag in a 2-dimensional or 3-dimensional space. For example, a RTLS smart tag generally uses one or both of the following wireless location-based methods for determining the position of a smart tag or the object the tag is attached to.

The first is a Time Difference of Arrival (TDOA) method. In one implementation of this method, the smart tag will broadcast a signal to multiple wireless receivers 140 at known locations. The time at which the signal is received by each receiver is measured, and a set of equations can be used to determine the position of the smart tag. Examples of systems using this method are a global positioning system (GPS) or a system using low frequency radio transmitters that use the time interval between radio signals (LORAN). Another example is an active smart tag used in a WiFi system that determines how long a signal takes to reach a receiver. Other companies that use this principle for RTLS systems are AeroScout Inc., Redwood City, CA; NanoTron Technologies, GmbH, Berlin, Germany; WhereNet, Santa Clara, CA; and, MultiSpectral Solutions, Inc., Germantown, MD.

A RTLS may also use a Received Signal Strength Indicator (RSSI) method. This latter method requires tags or fixed transceivers to measure the received power (signal strength) of the incoming signals. Then, using either known variations of signal strength vs. distance from transmitters, or by measuring the signal strengths at various locations and matching these measured strengths to the measured strengths, position can be determined. Other companies that provide commercially available products using the RTLS system include Wavetrend, Fairfax VA, and PanGo Networks, Framingham, MA.

One example of an active smart tag suitable for use in an RTLS system is an Ekahau™ smart tag, which communicates with wireless receivers in a wireless local area network (WLAN) through IEEE 802.11b and 802.11g standards. The Ekahau™ smart tag is commercially available from Ekahau, Inc., Reston VA and may be used in the present exemplary embodiment. Other examples of suitable smart tags may be provided, and include those, such as described, in U.S. Pat. No. 6,853,303, which is incorporated herein.

As noted, the data from the smart tag may be acquired by data acquiring devices 140, such as readers 140, readers/writers 140, scanners 140, or receivers, such as wireless receivers 140, as well as other suitable devices. A reader or scanner may include an antenna for transmitting a trigger signal to a smart tag and receiving a return signal from the tag containing information. The data acquiring devices 140 may be placed in any one or more of the critical spots of the process including but not limited to the area where the components 110 and/or PPE articles 120 are handed out to the individual. In some exemplary embodiments, one or more data acquiring devices 140, such as readers or scanners 140 are hand-held. For example, a receiver 140 may be a wireless node of a wireless local area network (WLAN) that may provide internet access point.

The readers 140 may be linked to a remote programmable electronic system 150 through the network 160. The programmable electronic system 150 includes functionalities that enable tracking usage of the components against at least a predetermined criterion, such as a in the exemplary embodiment a change-out criterion. These predetermined criteria may include, but are not limited, to circumstances regarding the components in terms of their servicing, repairing, cleaning, maintaining, decontaminating, or other processing. For example, change-out may occur if: the time weighted exposure level of the component in the working environment exceeds a threshold value(s); the concentration level(s) of particular contaminants exceed threshold value (s); the presence of unexpected contaminants in the working environment; persons with particular profiles should not be exposed to various contaminants; particular kinds of PPE articles should not be used when certain contaminants are present, or concentration and exposure thresholds exceeded.

Figure 5:
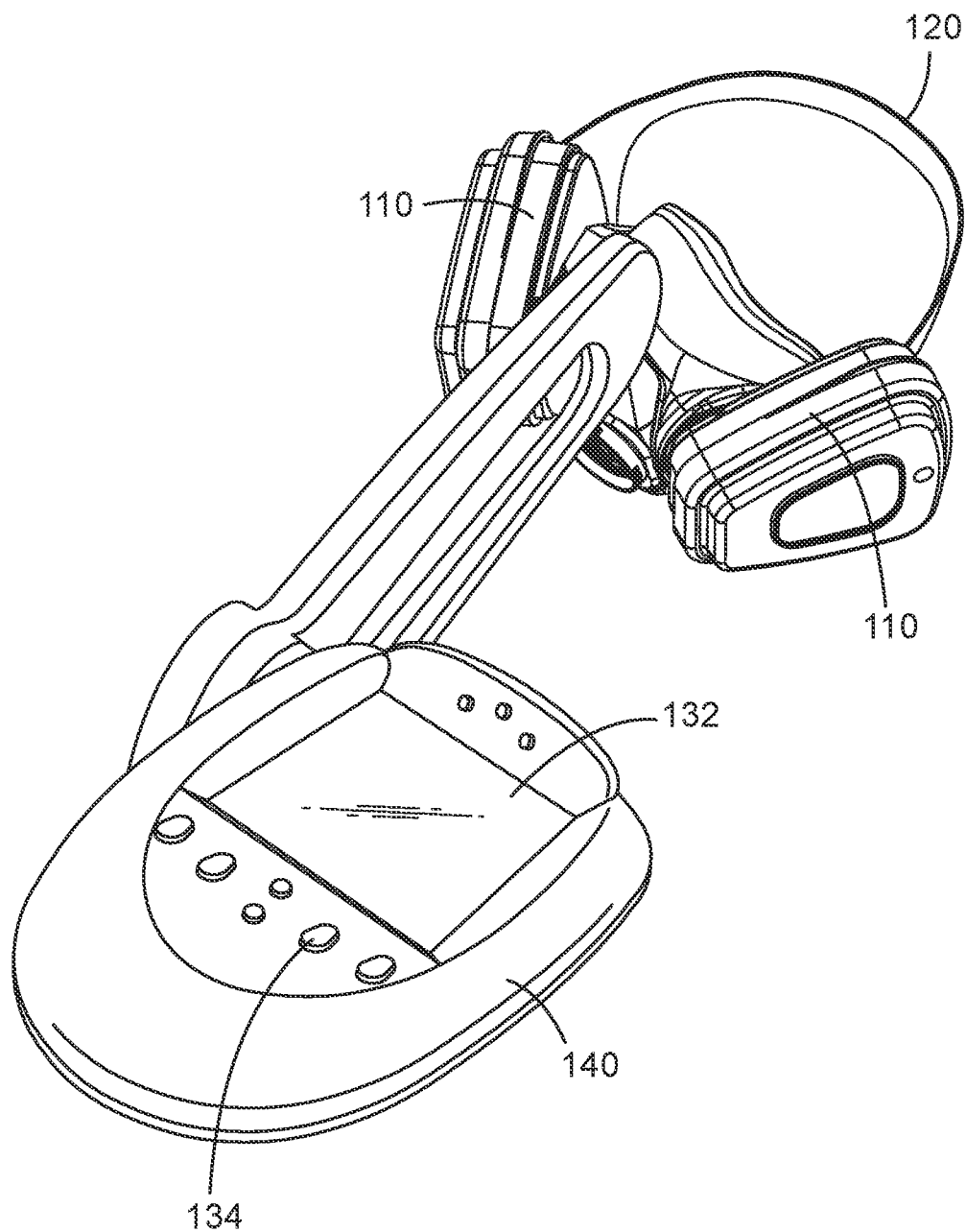
FIG. 5 is a schematic view of an RPE article including the pair of filter cartridge components tagged with smart tags and a portable reader.

As illustrated in FIG. 1, the reader 140a may be stationed at the entrance of the work environment 125 and acquires relevant data of the wearer; component 110, and the PPE article 120, such as at the start of the workday or shift and at the end of the work day or shift. The readers may be in several other locations, such as where the components are removably coupled to the PPE article. This information is sent to a database of the computer system 150 for the purpose which will be described. Alternatively or additionally, one or more readers 140 may be located within the actual work environment 125 so as to provide opportunities for wearers obtaining readings in the work environment 125. Alternatively or additionally, a portable reader 140 may be utilized (see FIG. 5), such as when the PPE 120 and the component 110 are issued prior to entering the work environment. A typical portable reader 140 may have a display 132 and keypad 134 for data input and are wirelessly connected to the network 160. The portable reader 140 may be used when the tagged components or PPE article are in the work environment 125 or uncoupled to the PPE article 120 at the end of a work shift. The present disclosure does not place limitations on the locations or timing of reading of the tagged components or PPE article.

Exemplary suitable sensors 145 of some exemplary embodiment may include, without limitation, measurement of the following analytes/parameters: electromagnetic radiation (such as thermal and visible), ionizing radiation, nuclear radiation, chemicals (such as liquids, solids, vapors, gases and mists/aerosols), biological analytes, particulates, noise, heat stress, motion, as well as others. The transducers may be of the electrical or optoelectronic type. The sensors 145 may be mobile or stationary in the work environment and connected, as for example, by wireless to the network. In a mobile mode, the sensors 145 may be disposed on the PPE or on the component. The sensed information data is generally related to the usage of the component being tracked as will be explained. The data, as noted, concentration levels, types of contaminants, presence or absence of contaminants, insufficient or no current to run a circuit of the component, inadequate pressure for a SCBA, insufficient or no battery power, breakthrough of a chemical through a filter, or inoperable safety mechanisms. The present disclosure is not limited by these examples since what is sensed encompasses all known factors that may relate to the condition of a component that is to be coupled to PPE articles.

The network 160 may include, without limitation, a local-area network (LAN), wide area network (WAN), the internet, or a wireless network, such as a wireless local area network (WLAN). The programmable electronic system 150 may represent any type of computer system, programmable logic devices, or the like. The computer system 150 may include server computers, client computers, PC-based servers, minicomputers, midrange computers, mainframe computers; or other suitable devices. In some exemplary embodiments, the computer system 150 may include portable computer systems including laptops, handheld computer systems. In addition, the system 100 may include one or more local computer systems 170 located in the work environment 125. As such, workers may be able to obtain pertinent data, for example, a real-time assessment of the condition of the component while in the work environment 125. The local computer system 170 typically includes portable computer systems including laptops, handheld computer systems. The local computer system 170 may also include other computer systems, such as, client computers, PC-based servers, minicomputers, midrange computers, mainframe computers; or other suitable devices.

Figure 2:
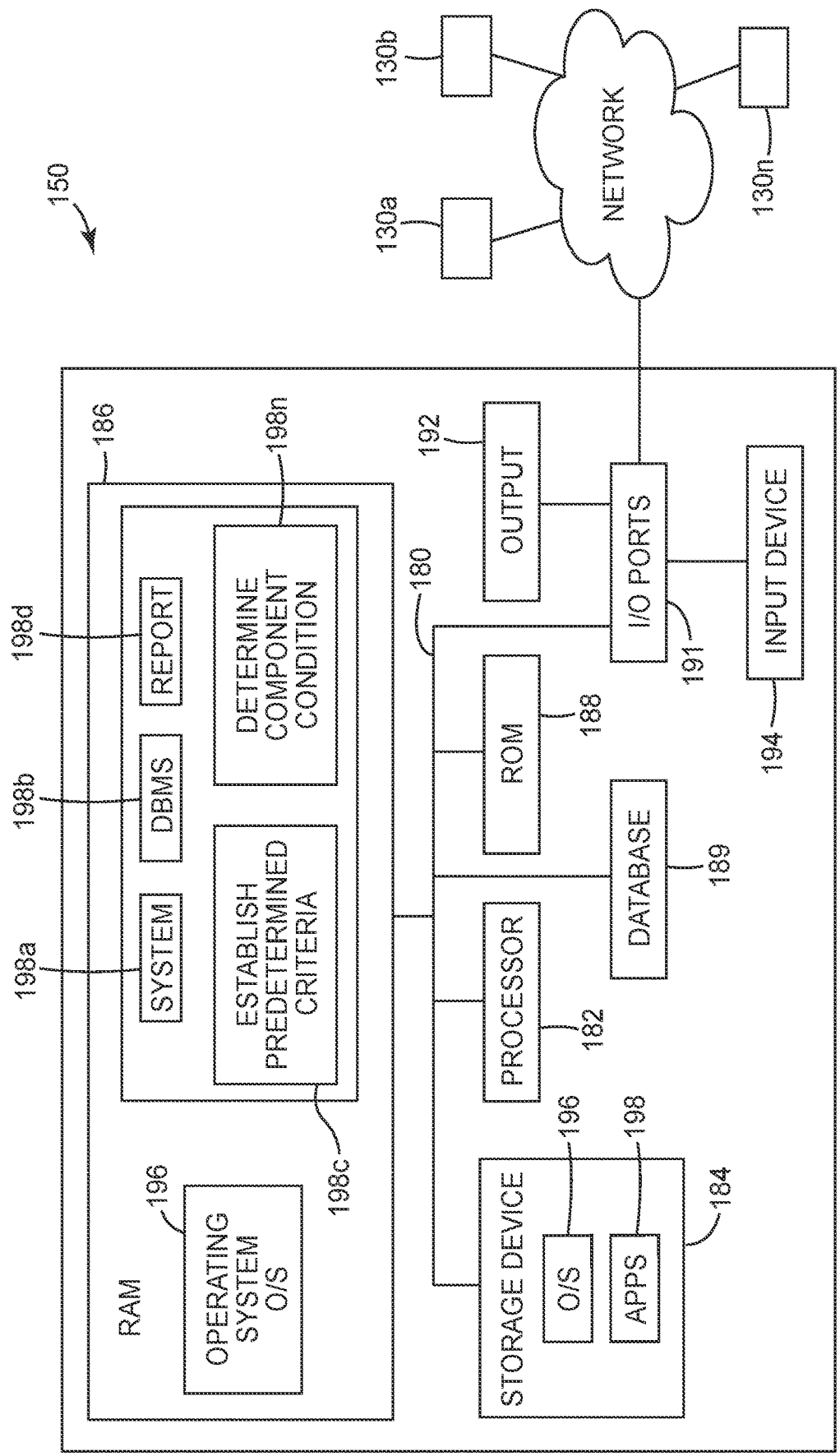
FIG. 2 is block diagram of a computer system utilizable in the condition determining system of the present disclosure.

With continued reference to FIG. 2, there is depicted a server computer system 150. It is depicted as comprising at least one system interconnect bus 180 to which various components are coupled and communicate with each other. Coupled to the system interconnect bus 180 is at least a single processor unit 182, storage device 184, memory such as random access memory (RAM) 186, read only memory (ROM) 188, a relational database management system (DBMS) 189, and input/output (I/O) ports 191. The relational database is a computer database management system 189 controlling the storing, updating, and retrieving of data to database files for use in tracking usage of components against one or more predetermined criteria. The database files contain all relevant information pertaining to the operational parameters of the readers. Furthermore, one or more output devices 192 such as a display, as well as one or more user interface input devices 194, such as a keyboard and/or pointing device is respectively coupled to the I/O ports 191. In known fashion, the output and input devices 192 and 194; respectively permit wearer interaction with the computer system 150. The I/O port 191 typically includes various controllers (not shown) for each input device 194, such as a keyboard, mouse, joystick, and the like, as well as the output device 192, such as an Ethernet network adapter, infrared device and display (not shown). The processor 182 controls the input device 194 which provides a user interface for allowing a wearer to access information, such as usage history of components being tracked.

The processor unit 182 may be any suitable processor and sends and receives instructions and data to and from each of the computer system's components that are coupled to the system interconnect bus 180 to perform system operations based upon the requirements of the computer system's operating system (OS) 196, and other specialized application programs 198a-198n (collectively 198).

The ROM 188 typically controls basic hardware operations. The storage device 184 may be a permanent storage medium, such as a hard disk, CD-ROM, tape, or the like, which stores the operating system 196 and the specialized applications programs 198. The RAM 186 is volatile memory. The contents of the RAM 186 may be retrieved from the storage device 184 as required. Illustratively, the RAM 186 is shown with the operating system 196 and application programs 198 concurrently stored therein. The program code of the operating system 196 and/or application programs 198 is sent to the RAM 186 for temporary storage and subsequent execution by the processor 182. Additionally, the RAM 186 is capable of storing files from the operating system 196, as well as files from one or more application programs.

An information retrieval system application program(s) 198a is one typically utilized for controlling operations of the information retrieval system 102 including the functionalities described herein with respect to the smart tags 130, data acquiring devices 140, and sensors 145. Provision is made for a suitable database management system application 198b to run the database 189 in a manner consistent with the present disclosure. Also, provision is made for an establish predetermined criteria application 198c. This may, in some cases, be a software application provided by a manufacturer of the components or PPE article that are to be tracked. In some exemplary embodiments, this software application may be used to establish conditions for proper usage of the component or PPE article as determined by the rules and regulations established by the government, insurance company or other entity interested in the results. The establish condition determining application 198c is updatable to establish a new or current criteria related to actual conditions of the component in the working environment, as for example, by using the data acquired.

A report generating application 198d is provided that may generate reports containing a variety of data in different reporting formats tailored for purposes including those described below. These reports may be generated to allow workers, supervisors, health professionals to access the history and status of components and/or articles; their medical information, information relating to fit-testing, training, job responsibilities, seniority or experience, access privileges or any other information, history of component servicing, maintenance, change-out, as well as other information.

The determining component condition application 198n of the present disclosure enables determining the conditions of the tagged components following retrieval of tag information against predetermined criteria established by the establish predetermined criteria application 198c.

Figure 6:
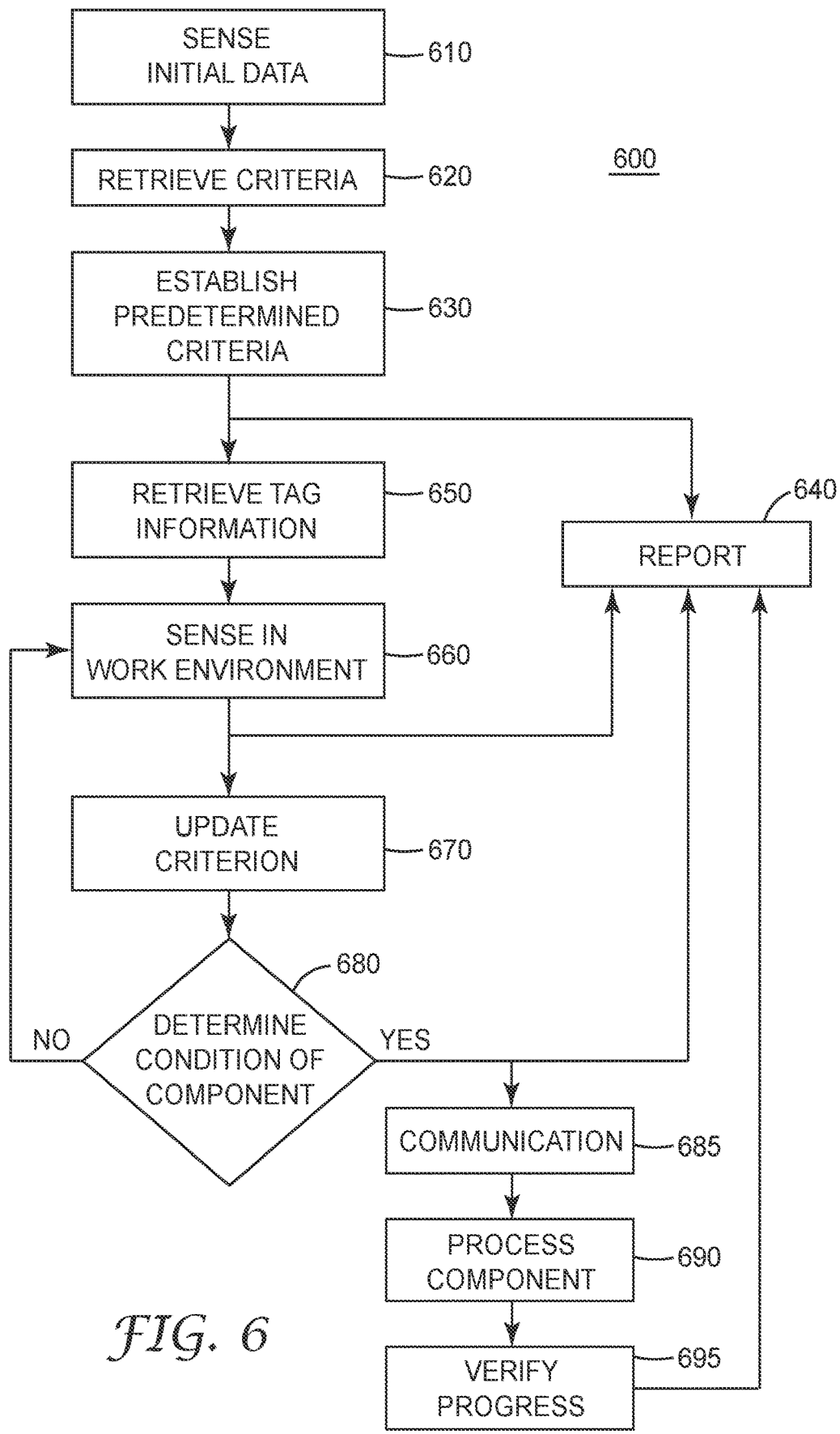
FIG. 6 is a flow diagram of one exemplary embodiment of a process that may be performed according to the present disclosure.

Reference is made to FIG. 6 for illustrating one exemplary embodiment of a tracking process 600 that may be implemented by the component condition determining system 100. The tracking process 600 enables the condition of a component 110 that is tagged with a smart tag 130 to be determined based on comparing its tracked usage against at least a predetermined criterion which in the exemplary embodiment is a change-out condition of a filter cartridge 110 relative to a respirator (RPE) 120. Alternatively, the present disclosure also envisions that the PPE article 120, that is to be coupled to the component 110, may be tagged with the smart tag towards the end of determining the condition of the component. Such circumstances may arise if the component is not easily tagged or cannot be tagged. The term "condition" as utilized in the present application means the particular state of one or more factors that affect the operational life or usefulness of one or more component(s) utilized as accessories for PPE articles.

In a Sense Initial Condition block 610 of the tracking process 600, sensing is performed by one or more of the sensors 145. In this embodiment, the type of component being tracked determines which variables in the working environment should be sensed and, therefore, which sensors to be used. Since filter cartridges are being tracked in this exemplary embodiment, the sensor 145 is of the type that collects data bearing upon the component's condition. In particular, concentration levels of particular hazardous materials over a period of time may be sensed. As will be explained, the concentration levels assist in establishing a predetermined criterion regarding the condition of the tagged component. The initial data collected may reflect low, average, and peak concentration levels of the particular hazardous material(s).

While hazardous materials are being monitored in the exemplary embodiment, the present disclosure envisions that there are no limits on the variables that may be sensed and the relationship these variables have in determining the condition of the component. For example, variable factors relating to other aspects of usage of a component may include: charge of a battery, amps in a circuit, circulating air pressure of a filter and/or respirator. The tracking process allows this data to be forwarded to the database.

The tracking process 600 then proceeds to Retrieve Criteria block 620, whereat the establish a predetermined criteria application 198c retrieves the appropriate criteria for the component being tracked. If the exemplary component being monitored is a filter cartridge, the pertinent criterion (or criteria) that is relevant to the condition of the filter cartridge is selected. The set of criteria is stored in memory. The set of criteria may be obtained from many different sources that provide guidance on the proper usage of the component. The set of criteria may be downloaded, for example, from the internet. Typically, the manufacturer of the component may provide the set of criteria relevant to the condition of the component. The set of criteria may be developed by government, industry, the company operating the system 100, an insurance company, a standards body, and persons of interest, such as a safety officer, industrial hygienist, or the like. In one exemplary embodiment, the set of criteria may relate to minimum or maximum exposure times that a filter cartridge or respirator may safely operate. Another example of a set of criteria relates to proper battery charge of a component relative to acceptable limits of performance of the component. Still another example of a set of criteria governs use of when a filter cartridge component should be serviced, repaired, or otherwise treated is based on inadequate pressure exists in a self-contained breathing apparatus (SCBA).

Following the Retrieve Criteria, block 620, the tracking 600 proceeds to an Establish Predetermined Criteria block 630. In the block 630, the initial data that may be sensed in the block 610 is processed in the database by the establish predetermined criterion application 198c. As a result, a predetermined criterion for the component 110 may be established in the actual working environment. In such exemplary embodiments, the predetermined criteria application(s) 198c analyzes the collected monitored data in terms of the set of criteria the rules retrieved in the block 620 to determine the predetermined criterion that will determine the condition of the component during actual operation in the working environment is satisfied. For example, based on the initial concentration levels in work environment, then a maximum exposure time for the filter cartridge may be determined. The predetermined criterion takes into account what the exposure time should be for the filter cartridge in the work environment.

The tracking 600 may further include a Reporting block 640 that follows the Establish Predetermined Criteria block 630 under the control of the reporting application 198b. The Reporting block 640 is capable for generating a report relevant to a wide variety of subjects including, but not limited to, the condition of the component, the worker, the PPE article, the initial sensed data, the work environment, and other pertinent information. Typically, the Reporting block 640 generates a report in a format acceptable by an entity requesting the report, for example, the business entity using the system 100, or a governmental agency, such as OSHA. While the Report block 640 follows Establish Predetermined Criteria block 630, reports may be generated at any one or more other points in the process. The reports may be generated by the workers or other persons of interest or even in response to requests by the government. The reports generated may be transmitted across the internet as well. There is no time limit to generating the reports.

The tracking process 600 proceeds to a Retrieve Tag Information block 650. In this embodiment, the system 102 retrieves or acquires the data, as noted above, from the smart tags 130 by the data acquiring devices 140, such as a receiver 140, as well as the sensors 145. The smart tag 130 of this embodiment may be an Ekahau™ type to provide location information as well as the data of the smart tag. Other smart tags can be provided. The receiver 140 may be located in any number of places, such as the entrance to a work environment 125. In particular, retrieving information from the smart tag 130 may provide data as to when and where the wearer enters the working environment, exits the working environment, or passes another location. Optionally, in order to identify the wearer, the latter may present his/her badge to an appropriate data acquiring device 140. The smart tag 130 or the badge may also include other data regarding the wearer, such as medical, fit test, job description, seniority, training, and other qualifications. The retrieved data is forwarded to the database 189 of the computer system 150, and, if operational, the local computer system 170. The data may include the identification of an article, date, and or timestamp, as well as the location of the data acquiring device. The present disclosure envisions that the retrieving of tag information may occur more than once and at any suitable number of different points in the tracking process.

The tracking process 600 then may proceed to the Sense In Work Environment block 660. In the Sense In Work Environment block 660, the sensor 145 is operable for providing current sensed data, for example, regarding current concentration levels of benzene vapor, in the work environment 125. This data is forwarded to the database. The tracking process 600 then may proceed to the Update Criterion block 670. In the Update Criterion block 670, the data from the database from the sensor 145 is acted upon by the establish predetermined criteria application 198c, where a new analysis is conducted to determine whether an update predetermined criterion is to be used. Such updating enhances the overall advantages provided by the present disclosure. While the Sense In Work Environment block 660 and the Update Criterion block 670 are illustrated, they need not be present used in the tracking process 600. In such a case, the process 600 may proceed to the Determine Condition of Component block 680.

The tracking process 600 then may proceed to the Determine Condition of Component block 680. In the Determine Condition of Component block 680, the condition determining application 198n determines if the condition of the component satisfies the initial or updated criterion. In particular, in an exemplary embodiment, a determination is made as to whether a filter cartridge has an exposure time that exceeds the recommended exposure time of the component in the working environment as determined in the Establish Predetermined Criterion block 630. In the exemplary embodiment, in the Determine Condition of Component block 680, the filter cartridge has satisfied the change-out condition (i.e., Yes) if its actual exposure time does exceed the recommended exposure time, when compared to the recommended exposure time, indicated in the Establish Predetermined Criteria block 630 or the Updated Criterion block 670. Conversely, the change-out condition is not satisfied (i.e., No) if the actual exposure time does not exceed recommended exposure time as determined in the Establish Predetermined Criteria block 630 or the Updated Criterion block 670. The determining may further include determining the extent-of-service life remaining for the component in the one or more working environments.

The tracking process 600 may also include a Communicate block 685, whereat compliance or non-compliance is communicated, using any known communication methodology, to appropriate persons, or reporting entities. Such a communication may be transmitted to the user, the database, the user's supervisor, industrial hygienist or other appropriate personnel. The process of this block may be occurring at other times. In one exemplary embodiment, such determinations may be made as a message to display screen of the computer or to a personal digital assistant (PDA). It will be appreciated that other suitable software applications may be used to provide such communication. In one exemplary embodiment, such communications may be made as a message to display screen of the computer or to a personal digital assistant (PDA). It will be appreciated other suitable software applications may be used to provide such communication. In some exemplary embodiments, such communications may include an alarm or audible signal to appropriate persons including the user and/or supervisor.

The tracking process 600 also includes a Process Article block 690 that may follow the Communicate block 685. A wide variety of processes may be performed to handle the article or component, such as cleaning, refurbishing, disposal, maintenance or the like of the article or component. A wide variety of disposal methods are contemplated, for example, being displaced in a bin, this will ensure that the component will not be used until some other steps are undertaken.

The tracking process 600 may then proceed to Verify Processing block 695. In the Verify Processing block 695, a data acquiring device 140 may be stationed adjacent to the processing area, such as a disposal bin, for acquiring relevant identification data from its smart tag 130 that the processing of article or component has been verified. The verification data is transferred to the server's database for storage in the internal memory and subsequent use. As a consequence, processing is duly recorded in the database.

EXAMPLES

The following examples are prophetic examples using the principles of the present disclosure.

Example 1

In this example, the system includes a respirator cartridge component tagged with a passive smart tag, such as an RFID tag, a tag reader at a (portal) stationed at the entry of a work area (e.g. paint booth). The database stores information when the smart tags are read at the tag reader. Safety personnel/workers may access or use the information by a computer system in the work environment that is configured to allow safety personnel/workers to obtain a change-out determination or obtain other data while in the work environment.

Figure 3:
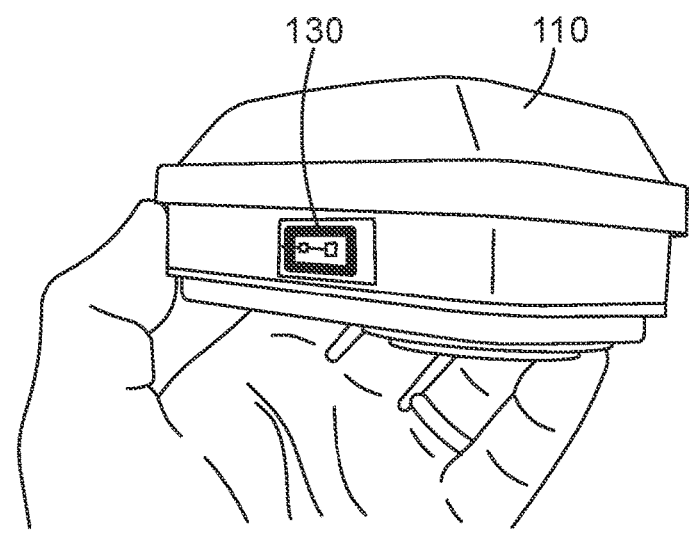
FIG. 3 is a schematic view of a filter cartridge component coupled to a smart tag.
Figure 4:
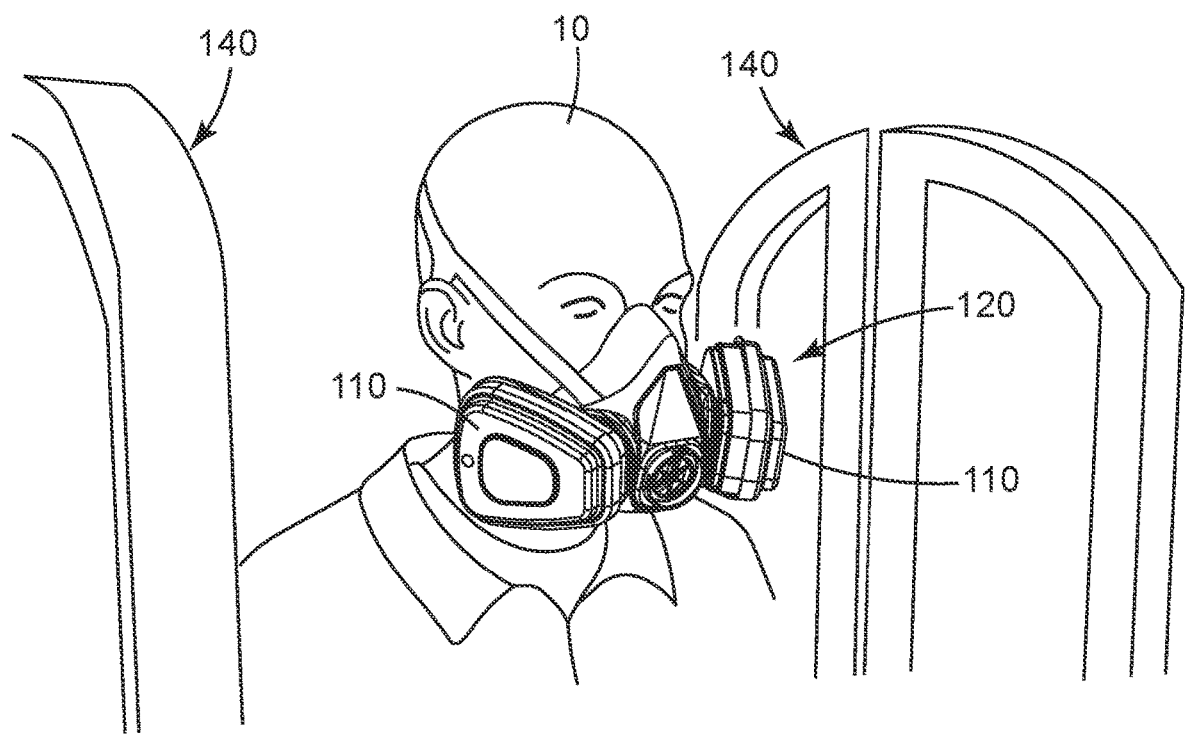
FIG. 4 is a schematic view of a wearer passing a reader portal utilized in an exemplary information retrieval system of the present disclosure and wearing an RPE article including a pair of tagged filter cartridge components coupled thereto.

Within an automotive paint shop, methyl ethyl ketone is identified as a principal organic vapor hazard. For respiratory protection, workers use 6000 series half face piece respirators equipped with 60921 P100/OV cartridge components. Based on air sampling data, a time weighted average (TWA) concentration of 300 ppm MEK is sensed. Based on change-out software calculations, an 8 hr. shift change-out schedule is put in place. A worker dons a respirator RPE with new filter cartridge components at the beginning of the working day. The filter cartridge components may be labeled with passive Smart tags (as shown in FIG. 3). At the time of issue of the filter cartridge components, the smart tags may be encoded with the identity of the wearer. On the way into the paint booth, the worker passes through a tag reader as illustrated in FIG. 4. The smart tags are read and a time point is entered in an associated database to mark the beginning of use. Throughout the working day, additional time points may be entered for the specific tags when the individual passes through the portal.

At the end of the working day, the respirator is stored outside the paint booth. The following day, the worker dons the same respirator and proceeds through the portal into the booth. The smart tags may be read, and the time data within the database are to be used to determine that exposure time for the component has been exceeded and a change-out condition is present. Any suitable user warning device, such as an audible beep, notifies the wearer that the filter cartridge components have been used beyond baseline conditions. Such information is recorded and stored in the database, enabling review by the safety coordinator.

Example 2

In this example, the system comprises the following: respirator cartridge components tagged with passive RFID smart tags; a portable tag reader utilized within a central respirator storage location; a database which stores information when tags may be read; and a software interface which allows safety personnel/workers to access the use or tracking information and history.

Within a petrochemical refinery, benzene vapor is identified before use of the smart tags as a contaminant. For respiratory protection, workers use 6000 series half face piece respirators equipped with 60921 P100/OV cartridge components. The presence of benzene makes change-out after an 8-hr. work shift a requirement. Respirators may be kept within a common area of the facility, and the supply person uses a portable tag reader (FIG. 5), with which he reads the smart tags before a worker takes the respirator to begin work. At the time of issue of the cartridge components, the smart tags may be read and linked to the identity of the wearer, and an initial time point is entered in an associated database to mark the beginning of use. At the end of the workday, the respirator is checked back in to the common storage/maintenance area. If the cartridge components have not been disposed of, an audible sound will cue the supply person and worker the following day when they are added to the respirator and read again prior to reissue.

Example 3

A system, as in Example 1, is utilized to track filter cartridge component change-out. In this instance, however, re-writable RFID smart tags on the component may be employed so that the time data may be logged on the smart tag rather than in a database, each time the individual passes through the portal. A time interval greater than 8 hours after the initial tag reading triggers an alert to the wearer that cartridge components must be changed by the change-out conditions determining mechanism.

Example 4

A system, such as in Example 2, is utilized to track cartridge component change-out. The cartridge components may be again read by a supply person prior to issue to the worker. In this instance, however, an additional reader is placed on a common waste barrel where cartridge components are disposed of Each cartridge is read as it is placed into waste so that disposal within a single work shift is ensured. Cartridge components that remain in use beyond a single shift trigger an electronic alert notice to the supply person, worker, safety personnel, and/or the industrial hygienist.

Example 5

In this example, the system comprises the following: respirator face pieces tagged with re-writable RFID smart tags; a portable tag reader utilized within a central respirator storage location; disposable 60921 P100/OV cartridge components for protection against organic vapors. In this embodiment, the cartridge is tagged although it need not be.

Within a petrochemical refinery, benzene vapor is identified as a contaminant. For respiratory protection, workers use 6000 series half face piece respirators equipped with 60921 P100/OV cartridge components. The presence of benzene makes change-out after an 8-hr. work shift a requirement. Respirators may be kept within a common area of the facility, and the supply person uses a portable tag reader (FIG. 5), with which he/she programs the re-writable RFID tag on the respirator face piece before the worker takes the respirator to begin work. The smart tag is programmed with the identity of the wearer, and an initial time point/date to mark the beginning of use of fresh respirator cartridge components. At the end of the workday, the respirator is checked back in to the common storage/maintenance area. When the utilized cartridge components are disposed of and replaced with fresh ones, the smart tag is re-programmed to log the change-out and the new start time point. If the cartridge components are not disposed of (and the smart tag reprogrammed), a beep/visual from the reader will cue the supply person and worker the following day when the smart tagged face piece is read again prior to reissue.

Example 6

In this example, the information retrieval system 100 comprises the following: respirator cartridge components tagged with passive RFID smart tags; a portable tag reader utilized within a central respirator storage location; a database which stores information when tags are read; a fixed wireless chemical sensors (PID sensors) that stream data to the database; a software interface which allows safety personnel/workers to access the use information and history.

Within an automotive paint shop, methyl ethyl ketone (MEK) is identified as a principal organic vapor hazard. For respiratory protection, workers use 6000 series half face piece respirators equipped with 60921 P100/OV cartridge components. A worker dons a respirator with new cartridge components at the beginning of the working day. Both cartridge components may be labeled with passive RFID smart tags (as shown in FIG. 3). At the time of issue of the cartridge components, the smart tags may be read, and the time of issue and identity of the wearer may be stored within the database.

During the workday, wireless chemical sensors placed throughout the shop record and stream concentration data on the MEK vapor to the same central database that maintains the smart tag information. The chemical concentration data may be utilized to update the change-out conditions by calculating remaining service life and timing for change-out of the respirator cartridge components utilized by employees within the facility.

At the end of the workday, the respirator is checked back in to the common storage/maintenance area. The smart tags on the cartridge components are read, and if the duration of issue exceeds the calculated service life, a visual cue in the software interface will indicate the need to change the cartridge components.

Example 7

The system of Example 6 is utilized to track cartridge components and to monitor the environment so as to calculate cartridge service life. In this instance, however, the wireless chemical sensors are worn on the individual workers, so that the chemical concentration data for a particular individual may be utilized to allow the establish change-out conditions application to calculate that person's unique remaining cartridge service life. The passive RFID smart tags are employed as described in Example 6 for tracking appropriate disposal and issue of fresh cartridge components relative to the calculated individual change-out schedule.

It will be appreciated that based on the above description, aspects of the disclosure include methods, systems, and computer program products for determining change-out conditions for component joinable to articles, such as articles of personal protection equipment (PPE), by tracking their usage in monitored working environments against predetermined change-out criteria. Further aspects of the disclosure include methods, systems, and computer program products utilized for ensuring worker safety, and providing for appropriate change-out of components. Still further aspects of the disclosure include methods, systems, and computer program products utilized for achieving the foregoing economically and expeditiously.

It will be appreciated that numerous and varied other arrangements may be readily devised in accordance with these principles by those skilled in the art without departing from the spirit and scope of the invention as claimed.

Although the methods and system of the present disclosure have been described with referent to specific exemplary embodiments, those of ordinary skill in the art will readily appreciate that changes and modifications may be made thereto without departing from the spirit and scope of the present invention.

What is claimed is:

1. A system comprising:
   an article of personal protection equipment (PPE) that can be worn by a user, and at least one component coupled to the article of PPE;
   a smart tag coupled to the at least one component or the article of PPE;
   a computing device comprising one or more computer processors and a memory that further comprises instructions that when executed by the one or more computer processors cause the one or more computer processors to:
   determine a duration of usage of the component based on tracked data received from the smart tag, wherein the duration of usage represents a total exposure time of the component to a particular type of work environment based on a cumulative value of the tracked data; and
   determine a condition of the component based at least in part on a determination of whether the duration of usage of the component exceeds a predetermined service life of the component.

2. The system of claim 1, wherein the instructions that cause the one or more computer processors to determine the condition of the component further comprise instructions that when executed by the one or more computer processors cause the one or more computer processors to determine the condition of the component based at least in part on additional data corresponding to the user from the smart tag that indicates at least one of identity, medical, fit test, job description, seniority, training, or qualification information of the user.

3. The system of claim 1, wherein the tracked data indicates at least one of: an entry time when the user entered the working environment, an exit time when the user exited the working environment, an entry location where the user entered the working environment, an exit location where the user exited the working environment, a type of personal protection equipment or type of component, historical information relating to the article of PPE or component, an identifier of the user, a location where the article of PPE was used, a condition under which the article of PPE was used, maintenance performed on the article of PPE, a requirement for using the article of PPE, or a description of the working environment.

4. The system of claim 1 further comprising at least one smart tag scanner configured to read the smart tag, wherein to determine a duration of usage of the component, the at least one smart tag scanner is communicatively coupled to the computing device and configured to receive the tracked data from the smart tag and send the tracked data to the computing device.

5. The system of claim 1, wherein the memory further comprises instructions that when executed by the one or more computer processors cause the one or more computer processors to output a notification based on the condition of the component.

6. The system of claim 1, wherein the memory further comprises instructions that when executed by the one or more computer processors cause the one or more computer processors to perform, based on the determination of the condition of the component, one or more operations.

7. The system of claim 1, wherein the tracked data further includes stream concentration data obtained from one or more chemical sensors in the work environment.

8. A method comprising:
   providing at least one component coupled to an article of personal protection equipment (PPE) that can be worn by a user;
   providing a smart tag coupled to at least the component or the article of PPE;
   determining a duration of usage of the component based on tracked data received from the smart tag, wherein the duration of usage represents a total exposure time of the component to a particular type of work environment based on a cumulative value of the tracked data; and determining, by a computing device, a condition of the component based at least in part on a determination of whether the duration of usage of the component exceeds a predetermined service life of the component.

9. The method of claim 8, wherein determining the condition of the component further comprises determining the condition of the component based at least in part on additional data corresponding to the user from the smart tag that indicates at least one of identity, medical, fit test, job description, seniority, training, or qualification information of the user.

10. The method of claim 8, wherein the tracked data indicates at least one of:
an entry time when the user entered the working environment, an exit time when the user exited the working environment, an entry location where the user entered the working environment, an exit location where the user exited the working environment, a type of personal protection equipment or type of component, historical information relating to the article of PPE or component, an identifier of the user, a location where the article of PPE was used, a condition under which the article of PPE was used, maintenance performed on the article of PPE, a requirement for using the article of PPE, or a description of the working environment.

11. The method of claim 8, wherein at least one smart tag scanner is configured to read the smart tag, wherein determining a duration of usage of the component further comprises:
receiving, by the computing device and from the at least one smart tag scanner communicatively coupled to the computing device, the tracked data from the smart tag.

12. The method of claim 8, further comprising outputting a notification based on the condition of the component.

13. The method of claim 8, wherein the tracked data further includes stream concentration data obtained from one or more chemical sensors in the work environment.

14. A computing device comprising:
one or more computer processors; and
a memory comprising instructions that when executed by the one or more computer processors cause the one or more computer processors to:
receive tracked data from a smart tag that is coupled to at least one component coupled to an article of personal protection equipment (PPE) that can be worn by a user;
determine a duration of usage of the component based on tracked data received from the smart tag, wherein the duration of usage represents a total exposure time of the component to a particular type of work environment based on a cumulative value of the tracked data; and
determine a condition of the component based at least in part on a determination of whether the duration of usage of the component exceeds a predetermined service life of the component.

15. The computing device of claim 14, wherein the memory comprises instructions that when executed by the one or more computer processors cause the one or more computer processors to determine the condition of the component based at least in part on additional data corresponding to the user from the smart tag that indicates at least one of identity, medical, fit test, job description, seniority, training, or qualification information of the user.

16. The computing device of claim 14, wherein the tracked data indicates at least one of: an entry time when the user entered the working environment, an exit time when the user exited the working environment, an entry location where the user entered the working environment, an exit location where the user exited the working environment, a type of personal protection equipment or type of component, historical information relating to the article of PPE or component, an identifier of the user, a location where the article of PPE was used, a condition under which the article of PPE was used, maintenance performed on the article of PPE, a requirement for using the article of PPE, or a description of the working environment.

17. The computing device of claim 14, wherein the memory comprises instructions that when executed by the one or more computer processors cause the one or more computer processors to receive, from at least one smart tag scanner communicatively coupled to the computing device, the tracked data from the smart tag.

18. The computing device of claim 14, wherein the memory comprises instructions that when executed by the one or more computer processors cause the one or more computer processors to output a notification based on the condition of the component.

19. The computing device of claim 14, wherein the memory comprises instructions that when executed by the one or more computer processors cause the one or more computer processors to perform, based on the determination of the condition of the component, one or more operations.

20. The computing device of claim 14, wherein the tracked data further includes stream concentration data obtained from one or more chemical sensors in the work environment.

* * * * *